US 11,680,509 B2

(12) United States Patent
Lundström et al.

(10) Patent No.: US 11,680,509 B2
(45) Date of Patent: Jun. 20, 2023

(54) METHOD AND SYSTEM FOR DIAGNOSING OXIDATION OF A SUBSTANCE IN AN EXHAUST GAS STREAM

(71) Applicant: Scania CV AB, Södertälje (SE)

(72) Inventors: Mikael Lundström, Hägersten (SE); Astrid Simovits, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/775,619

(22) PCT Filed: Nov. 13, 2020

(86) PCT No.: PCT/SE2020/051091
§ 371 (c)(1),
(2) Date: May 10, 2022

(87) PCT Pub. No.: WO2021/101430
PCT Pub. Date: May 27, 2021

(65) Prior Publication Data
US 2022/0403768 A1 Dec. 22, 2022

(30) Foreign Application Priority Data
Nov. 19, 2019 (SE) .................................... 1951330-8

(51) Int. Cl.
*F01N 11/00* (2006.01)
*B01D 53/94* (2006.01)
(Continued)

(52) U.S. Cl.
CPC .......... *F01N 11/00* (2013.01); *B01D 53/9418* (2013.01); *B01D 53/9431* (2013.01);
(Continued)

(58) Field of Classification Search
CPC combination set(s) only.
See application file for complete search history.

(56) References Cited

U.S. PATENT DOCUMENTS 11,181,026 B1 * 11/2021 Webb ........................ F01N 9/00
11,536,183 B1 * 12/2022 Ott ........................... F01N 3/103
(Continued)

FOREIGN PATENT DOCUMENTS

DE 102012220722 A1 5/2014
DE 102015007751 A1 1/2016
(Continued)

OTHER PUBLICATIONS

Scania CV AB, International Patent Application No. PCT/SE2020/051091, International Search Report, dated Dec. 2, 2020.
(Continued)

*Primary Examiner* — Binh Q Tran
(74) *Attorney, Agent, or Firm* — Moore & Van Allen PLLC; W. Kevin Ransom (57) ABSTRACT

Disclosed is a method for diagnosing a first exhaust treatment component for treatment of an exhaust gas stream comprising means for oxidizing nitric oxide into nitrogen dioxide. A first reduction catalytic converter is arranged upstream said means for oxidizing nitric oxide into nitrogen dioxide, and a second reduction catalytic converter is arranged downstream said means. A reagent is for reduction of nitrogen oxides in said first catalytic converter, and a first sensor measures an occurrence of nitrogen oxide downstream said means but upstream said second reduction catalytic converter. The method comprises: causing a supply of reagent upstream said first reduction catalytic converter to an extent exceeding the extent to which reagent is consumed by the first reduction catalytic converter, determining a first measure of the occurrence of reagent downstream said means for oxidizing, and diagnosing said means for oxidizing nitric oxide into nitrogen dioxide based on said first measure.

16 Claims, 6 Drawing Sheets

(51) Int. Cl.
  *F01N 3/08*  (2006.01)
  *F01N 3/10*  (2006.01)
  *F01N 3/20*  (2006.01)

(52) U.S. Cl.
  CPC ....... *B01D 53/9495* (2013.01); *F01N 3/0842* (2013.01); *F01N 3/108* (2013.01); *F01N 3/2066* (2013.01); *B01D 53/9404* (2013.01); *B01D 53/9409* (2013.01); *B01D 53/9422* (2013.01); *B01D 53/9436* (2013.01); *F01N 2550/02* (2013.01); *F01N 2550/03* (2013.01); *F01N 2550/05* (2013.01); *F01N 2560/021* (2013.01); *F01N 2560/026* (2013.01); *F01N 2900/0416* (2013.01); *F01N 2900/1616* (2013.01); *F01N 2900/1621* (2013.01); *F01N 2900/18* (2013.01)

(56) References Cited

U.S. PATENT DOCUMENTS

| | | | |
|---|---|---|---|
| 2004/0040284 | A1 | 3/2004 | Upadhyay et al. |
| 2006/0153761 | A1* | 7/2006 | Bandl-Konrad ...... F01N 13/009 423/239.1 |
| 2009/0035195 | A1* | 2/2009 | Robel ................. F01N 13/0097 422/177 |
| 2010/0319316 | A1 | 12/2010 | Kasahara |
| 2013/0232958 | A1 | 9/2013 | Ancimer et al. |
| 2015/0096287 | A1* | 4/2015 | Qi ........................... F01N 3/208 60/286 |
| 2016/0367941 | A1 | 12/2016 | Gilbert et al. |
| 2018/0230877 | A1* | 8/2018 | Nilsson .............. B01D 53/9477 |
| 2019/0345861 | A1* | 11/2019 | Johansson ............... F01N 3/206 |

FOREIGN PATENT DOCUMENTS

| | | |
|---|---|---|
| JP | 2012036858 A | 2/2012 |
| WO | 2018013031 A1 | 1/2018 |

OTHER PUBLICATIONS

Scania CV AB, International Patent Application No. PCT/SE2020/051091, Written Opinion, dated Dec. 2, 2020.

Scania CV AB, Swedish Patent Application No. 1951330-8, Office Action, dated May 15, 2020.

Scania CV AB, International Patent Application No. PCT/SE2020/051091, International Preliminary Report on Patentability, dated May 17, 2022.

* cited by examiner

METHOD AND SYSTEM FOR DIAGNOSING OXIDATION OF A SUBSTANCE IN AN EXHAUST GAS STREAM

CROSS-REFERENCE TO RELATED APPLICATION(S)

This application is a National Stage Patent Application (filed under 35 § U.S.C. 371) of PCT/SE2020/051091, filed Nov. 13, 2020, of the same title, which, in turn claims priority to Swedish Patent Application No. 1951330-8 filed Nov. 19, 2019, of the same title; the contents of each of which are hereby incorporated by reference.

FIELD OF THE INVENTION

The present invention relates to combustion processes, and in particular to methods and systems for treatment of an exhaust gas stream resulting from combustion. The present invention also relates to a vehicle, as well as a computer program and a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g., in urban areas, which has also led to the adoption of various emission standards and rules in many jurisdictions. For example, the exhaust levels of e.g., nitrogen oxides ($NO_x$), hydrocarbons (HC), carbon monoxide (CO) and particles may be regulated for most kinds of vehicles in such standards and rules.

The undesired emission of substances can be reduced by reducing fuel consumption and also through use of exhaust treatment (purifying) of the exhaust gases that results from the combustion process, where the exhaust gases, for example, can be treated through the use of one or more catalytic processes. There exist various kinds of catalytic converters, where different types may be used for different kinds of fuel and/or for treatment of different kinds of substances being present in the exhaust gas stream.

With regard to at least nitrogen oxides $NO_x$ (such as nitric oxide NO and nitrogen dioxide $NO_2$) exhaust treatment often comprises a method where a reagent is supplied to the exhaust gas stream. The reagent is supplied in order to, usually through the use of a catalytic converter, reduce the presence of nitrogen oxides $NO_x$ to less pollutive substances (mainly nitrogen and water vapor). The reagent can be supplied by an additive being injected into the exhaust gas stream upstream the catalytic converter. A common type of catalytic converter that is being used in nitrogen oxide $NO_x$ reduction of this kind is a reduction catalytic converter, such as a Selective Catalytic Reduction (SCR) catalytic converter. There exist preferred relative proportions of nitric oxide NO and nitrogen dioxide $NO_2$ in the exhaust gas stream entering reduction catalytic converters in order for the most desired (fastest) chemical reactions to take place. However, the relative proportions of nitric oxide NO and nitrogen dioxide $NO_2$ in exhaust gases resulting from combustion are in general such that the exhaust gases contain a higher than desired proportion of nitric oxide NO in relation to nitrogen dioxide $NO_2$. Nitric oxide NO may therefore be subjected to oxidation to increase the relative proportion of nitrogen dioxide $NO_2$ in the exhaust gas stream.

SUMMARY OF THE INVENTION

It is an object of the present invention to provide a method and system for diagnosing oxidation of e.g., nitric oxide NO into nitrogen dioxide $NO_2$ prior to an exhaust gas stream enters a reduction catalytic converter. This object is achieved by a method according to claim 1.

According to the present invention, it is provided a method for diagnosing a first exhaust treatment component for treatment of an exhaust gas stream resulting from combustion in an internal combustion engine, said first exhaust treatment component comprising means for oxidizing nitric oxide NO into nitrogen dioxide $NO_2$, wherein nitrogen oxide $NO_x$ in said exhaust gas stream is reduced through the use of a first reduction catalytic converter being arranged upstream said means for oxidizing nitric oxide NO into nitrogen dioxide $NO_2$, and a second reduction catalytic converter being arranged downstream said means for oxidizing nitric oxide NO into nitrogen dioxide $NO_2$, wherein a reagent is supplied to said exhaust gas stream for reduction of nitrogen oxides $NO_x$ in said first catalytic converter, and wherein a first sensor is arranged to measure an occurrence of nitrogen oxide $NO_x$ downstream said means for oxidizing nitric oxide NO into nitrogen dioxide $NO_2$ but upstream said second reduction catalytic converter, the method comprises:
  a. causing a supply of reagent upstream said first reduction catalytic converter to reduce nitrogen oxide $NO_x$ through the use of said first reduction catalytic converter, reagent being caused to be supplied to an extent exceeding the extent to which reagent is consumed by the first reduction catalytic converter to thereby cause surplus reagent to be released by said first reduction catalytic converter,
  b. using output from said first sensor, determining a first measure of the occurrence of reagent downstream said means for oxidizing nitric oxide NO into nitrogen dioxide $NO_2$, and
  c. diagnosing said means for oxidizing nitric oxide into nitrogen dioxide based on said first measure.

As stated above, exhaust treatment systems for treatment of exhaust gases resulting from combustion in an internal combustion engine may comprise a reduction catalytic converter that reduces one or more substances occurring in the exhaust gas stream. The reduction catalytic converter may be utilized to reduce nitrogen oxides occurring in the exhaust gas stream, and may comprise a selective catalytic converter.

Reduction catalytic converters utilizes reagent in the reduction, but mere supply of additive to the exhaust gas stream is in general not sufficient to obtain the most efficient reduction, but further conditions may impact the efficiency of the reduction. For example, the chemical reactions occurring in the reduction catalytic converter may be temperature dependent, where at least a minimum temperature may be required, and where the reduction rate may increase with an increasing temperature.

However, as was mentioned above, the relative proportion between nitric oxide NO and nitrogen dioxide $NO_2$ in the exhaust gas stream entering the reduction catalytic converter may have a substantial impact on which, and the extent to which, various chemical reactions will occur, where the reaction speed, and hence efficiency in the reduction, may vary significantly among the various reactions. In particular with regard to the reduction of nitrogen oxides, it is in general a desire that the proportion of nitric oxides NO is the same as the proportion of nitrogen dioxide $NO_2$ to provide for the fastest chemical reaction and thereby most efficient reduction. When there is a surplus of nitric oxide NO, or nitrogen dioxide $NO_2$, other reactions, which may be considerably slower, take place to higher extents, thereby reducing the efficiency in the reduction.

When exhaust gases are discharged from an internal combustion engine, the relative proportion of nitric oxide NO is in general much higher than the proportion of nitrogen dioxide $NO_2$. In view of this, means for oxidizing nitric oxides, such as e.g., one or more oxidation catalytic converters, or other means for carrying out the oxidation, may be utilized to increase the presence of nitrogen dioxide $NO_2$ in the exhaust gas stream. The exhaust treatment systems may comprise more than one reduction catalytic converter, and oxidation of nitric oxides NO into nitrogen dioxide $NO_2$ may be arranged to be carried out upstream at least one reduction catalytic converter.

As was mentioned above, there may exist regulations regarding discharged tailpipe emissions. There may, however, also exist legislation that require diagnosis to be carried out in regard of the reduction catalytic converter feed gas, e.g., to ensure that desired relative proportions of nitric oxide NO and nitrogen dioxide $NO_2$ prevail in the exhaust gases reaching the reduction catalytic converter. This may be performed by diagnosing the oxidation of nitric oxides. Such diagnosis of the oxidation may be intrusive, and e.g., result in increased emissions during the diagnosis. For example, unburned fuel may be added to the exhaust gas stream when performing the diagnosis. According to embodiments of the invention, oxidation is diagnosed by a method that e.g., may reduce the negative impact on exhaust emissions.

According to the invention, exhaust gases, following passage through a first upstream reduction catalytic converter, are oxidized prior to entering a second downstream reduction catalytic converter. The oxidation may be carried out through the use of any suitable means for oxidizing nitric oxide NO into nitrogen dioxide $NO_2$. Oxidation of nitric oxide NO into nitrogen dioxide $NO_2$ may, for example, be performed in an oxidation catalytic converter, or similar device, being arranged upstream the downstream reduction catalytic converter. The oxidation catalytic converter, and/or other means for carrying out the oxidation, may consist of a separate exhaust treatment component, but may also form part of any other exhaust treatment component. For example, the means for oxidizing nitric oxide NO may form part of an exhaust treatment component comprising the upstream reduction catalytic converter. The means for oxidizing nitric oxides NO may also form part of e.g., a particulate filter.

The present invention utilizes the relationship that means being used for oxidizing nitric oxides NO inherently also oxidizes reagent such as e.g., ammonia $NH_3$, where the oxidation capabilities may form part of an exhaust treatment component having dual (or more) functionality. This is because the same precious metals operate as catalyst the various reactions. It has been realized that the feed gas of the downstream reduction catalytic converter therefore may be diagnosed by diagnosing oxidation of reagent such as ammonia. The means for oxidizing nitric oxides NO may form a combined oxidation catalytic converter and ammonia slip catalytic converter. An exhaust treatment component of this kind may hence oxidize nitric oxides into nitrogen dioxide, and e.g., oxidize unburned fuel occurring in the exhaust gas stream, and also oxidize ammonia ($NH_3$) into, inter alia, nitrogen gas.

The present invention relates to systems where there are two (or more) reduction catalytic converters. The reduction catalytic converter being arranged most upstream, i.e., closest to the internal combustion engine, may be subjected to "raw" exhaust gases exiting the internal combustion engine where the relative proportion of nitrogen dioxide usually is at most 15% (approximately 10%±5%) of the total content of nitrogen oxides. The feed gas to the upstream reduction catalytic converter in general need not be diagnosed since there may be no upstream treatment of the exhaust gases. With regard to the second, downstream, reduction catalytic converter on the other hand, the feed gas may be diagnosed according to embodiments of the invention.

According to the invention, reagent such as ammonia is caused to be supplied upstream the first reduction catalytic converter to reduce nitrogen oxide $NO_x$. The reagent is caused to be supplied to an extent exceeding the extent to which reagent is consumed by the first reduction catalytic converter. This causes reagent to be released by the first reduction catalytic converter, and enter the downstream located means for oxidizing nitric oxide NO into nitrogen dioxide $NO_2$. A first measure of the occurrence of reagent downstream the means for oxidizing nitric oxide NO into nitrogen dioxide $NO_2$ is determined, and the means for oxidizing nitric oxide into nitrogen dioxide is diagnosed based on this first measure.

Since it is the same precious metal that oxidizes reagent, such as ammonia, as well as nitric oxide, it can be concluded that if the oxidation of reagent is not being properly carried out, then the nitric oxide conversion will also not be properly carried out. With regard to the precious metal this may be, but is not limited to, platinum or any other metal having similar functionality.

The feed gas may hence be diagnosed by diagnosing the ability to oxidize reagent. The invention thereby has the advantage that oxidation may be diagnosed e.g., without the need for supplying e.g., unburned fuel so that thereby the negative impact on the exhaust emissions caused by such supply of unburned fuel may be avoided. The unburned fuel is also associated with an increased cost of fuel.

When diagnosing the means for oxidizing nitric oxide into nitrogen dioxide based on said first measure, it may be determined whether said first measure of the occurrence of reagent, e.g., ammonia, increases and/or exceeds a reference measure. When a reference measure is utilized, the reference measure may e.g., be empirically determined and stored in the control system that is configured to carry out the diagnosis, or be determined using output, such as sensor signals, from said sensor prior to increasing the supply of reagent to a level exceeding the capacity of the upstream reduction catalytic converter.

The first measure of the occurrence of reagent may be a measure utilizing a sensor being sensitive to the reagent as well as nitrogen oxides, e.g., a $NO_x$ sensor, or a sensor designed to specifically detect the reagent, such as an ammonia sensor, which may not be sensitive to nitrogen oxides. Hence the first measure of the occurrence of reagent may be a measure that includes the occurrence of nitrogen oxides. If the reagent is oxidized, the oxidized reagent will not be detected by either of the types of sensors, and hence different levels of occurrence will be indicated by the sensor signals in dependence of whether the oxidation is being properly taking place or not. For example, higher levels may be detected by the sensor when the oxidation does not occur, or only to a reduced extent. This may be utilized to detect a malfunctioning oxidation.

The first exhaust treatment component may comprise means for oxidizing nitric oxide (NO) into nitrogen dioxide ($NO_2$) by a catalytic process.

According to embodiments of the invention, a reference measure of the occurrence of reagent is determined prior to determining said first measure of the occurrence of reagent, and prior to causing supply of reagent to an extent exceeding the extent to which reagent is consumed by the first catalytic converter. The means for oxidizing nitric oxide into nitrogen dioxide may then be diagnosed using said first measure and said reference measure, where these measures may be compared. In particular, it may be determined whether said first measure exceeds the reference measure, e.g., to a predetermined extent. The oxidation may be determined to be malfunctioning when this is the case.

The reference measure may be determined when reagent is supplied to a reduced extent in comparison to the extent to which reagent is supplied when determining said first measure. When then the supply of reagent is increased, an increase in occurrence detected by the sensor will not be expected, since either nitrogen oxides will be reduced by the reagent, or alternatively the reagent will be oxidized. An increase may hence indicate a malfunctioning oxidation.

Reagent may be caused to be supplied to an extent corresponding to the extent to which reagent is consumed by the first catalytic converter when determining said reference measure. In this way, an increase in detected occurrence as sensed by the sensor caused by the increased supply of additive may be used as a clear indication of insufficient oxidation.

Furthermore, when determining the first measure and/or the reference measure, the measure may be determined as an average occurrence of reagent for a first period of time. The occurrence oftentimes varies essentially constantly, and by determining a measure representing the occurrence as a mean value representing a period of time the accuracy in the diagnosis may be increased.

Instead of determining a reference measure, the occurrence may be monitored, and e.g., an increase in detected occurrence arising following increase of the supply of reagent to a level exceeding the capacity of the upstream reduction catalytic converter. In case a reagent sensor is utilized, it can be determined whether the indicated occurrence exceeds a threshold, since in case oxidation is properly occurring, the presence of reagent will be little or non-existent.

In case there are more than one component comprising oxidizing capabilities between the upstream and downstream reduction catalytic converter, a sensor may be arranged downstream each such component to individually determine the oxidation capabilities of the individual components. According to embodiments of the invention, sensor signals of a sensor located downstream such components are utilized, in which case it is determined whether the oxidation capabilities of the components as a whole provides sufficient oxidation capacity.

The means for oxidizing nitric oxide into nitrogen dioxide may, for example, consist of an oxidation catalytic converter. As an alternative to using an oxidation catalytic converter in this regard, the desired effect can be obtained e.g., by providing at least a portion of substantially any aftertreatment component by a suitable catalytic coating, such as e.g., a particulate filter.

According to the invention, components that has an impact on the feed gas may hence be diagnosed to thereby also diagnose the feed gas.

The present invention may also be utilized e.g., in tests performed when the vehicle is taken in for service. In such situations, the method according to the invention can be performed when the vehicle is standing still with the internal combustion engine set to operate according to a predetermined operating point.

The invention may be carried out in a vehicle, and the invention also relates to a system corresponding to the method set forth above. The system is characterized in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Such means may also cause features according to embodiments of the invention to be carried out. For example, the reagent may be caused to be supplied to the exhaust gas stream, e.g., upstream said first reduction catalytic converter, by such means generating signals requesting the supply of reagent. Such signals may comprise signals controlling reagent supplying means such as an injector, and/or comprise signals requesting supply of reagent to be carried out by other means, such as another control unit.

Further characteristics of the present invention and advantages thereof are indicated in the detailed description of exemplary embodiments set out below and the attached drawings.

DETAILED DESCRIPTION OF EXEMPLARY EMBODIMENTS

In the following detailed description, the present invention will be exemplified for a vehicle. The invention is, however, applicable also for other kinds of transportation means, such as air and water crafts. The invention is also applicable for fixed installations.

Figure 1A:
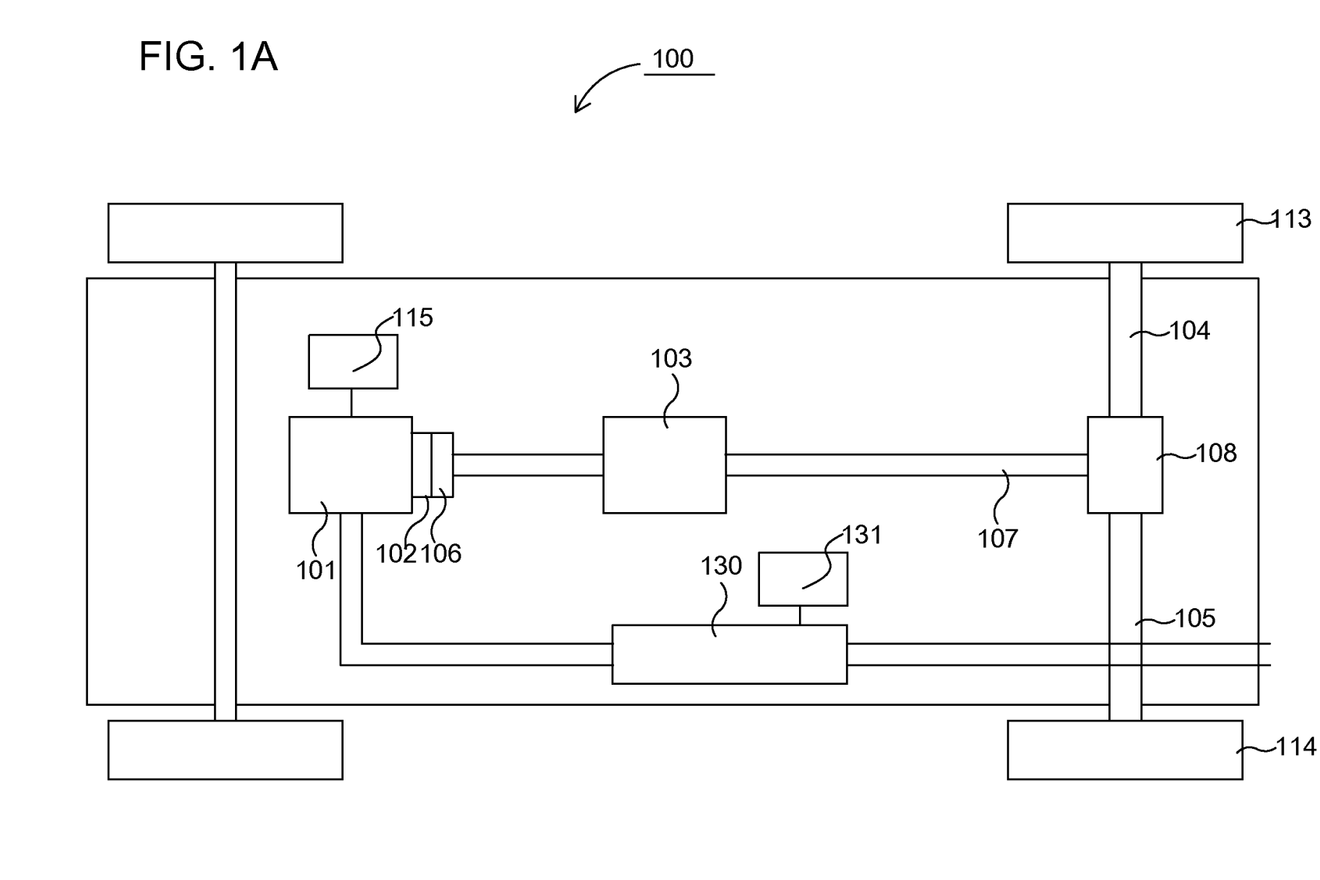
FIG. 1A illustrates a power train of an exemplary vehicle in which the present invention advantageously can be utilized.

FIG. 1A schematically depicts a power train of an exemplary vehicle 100. The power train comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108. The internal combustion engine 101 is controlled by the vehicle control system via a control unit 115.

FIG. 1A, consequently, discloses a powertrain of a specific kind, but the invention is applicable for any kind of power train and also e.g., in hybrid vehicles. The disclosed vehicle further comprises an exhaust treatment system 130 for aftertreatment (purifying) of exhaust gases that results from combustion in the internal combustion engine 101. The functions of the exhaust treatment system 130 are controlled by means of a control unit 131.

The aftertreatment system 130 can be of various kinds and designs, and according to the disclosed embodiment a reagent is supplied to the exhaust gas stream by injection of an additive. The additive may consist of the reagent, or a substance from which the reagent is formed when injected into the exhaust gas stream. An example of an exhaust treatment system 130 in which the present invention can be utilized is shown more in detail in FIG. 3, which schematically shows the exhaust treatment system 130 connected via an exhaust pipe 302 to the internal combustion engine 101. Exhausts generated by combustion in the internal combustion engine 101, indicated as an exhaust stream by arrows 303 are led to components of the exhaust treatment system 130.

Figure 3:
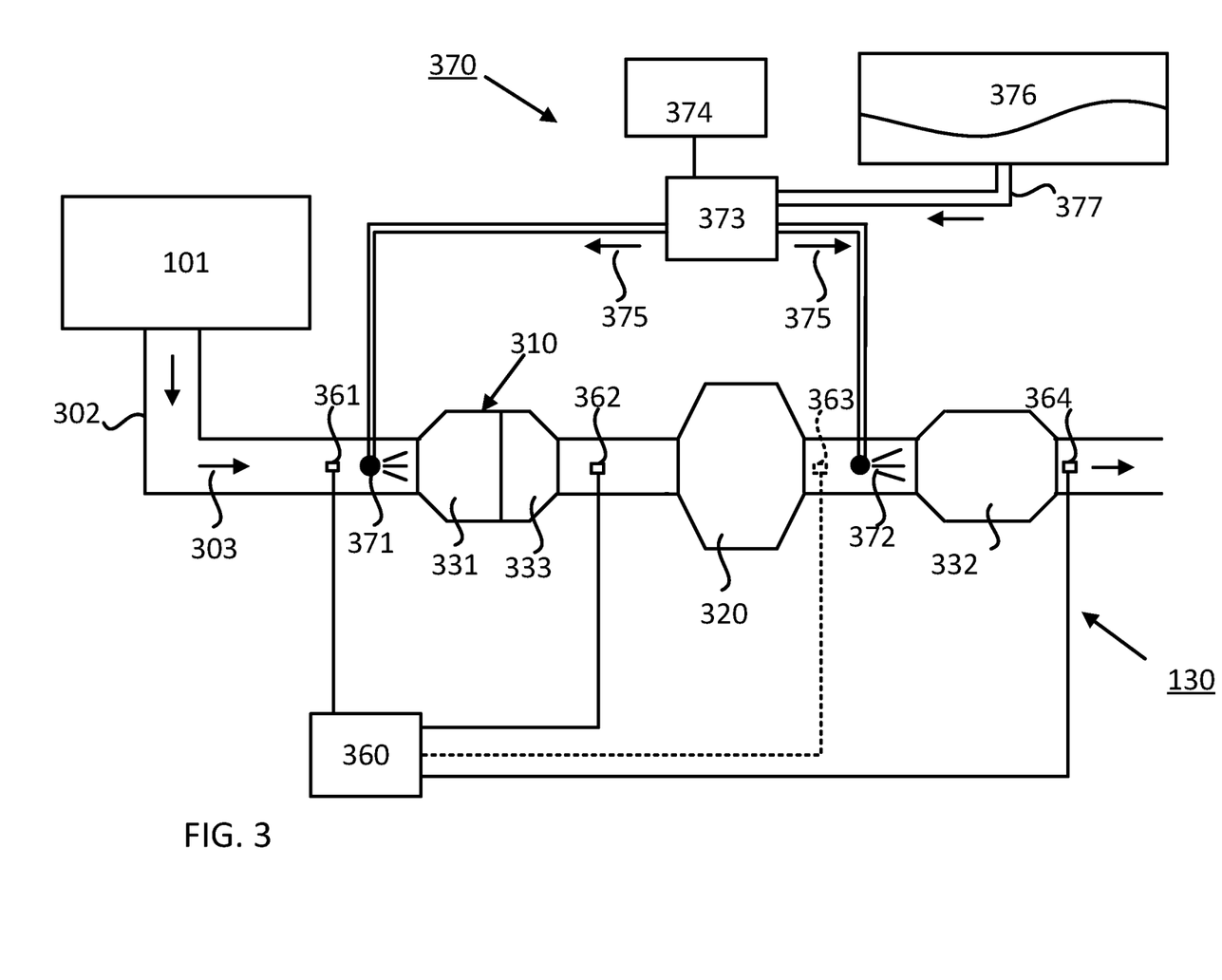
FIG. 3 illustrates an example of an aftertreatment system where a supply of additive is utilized and with which the present invention advantageously can be utilized.

Exhausts generated by combustion in the engine 101 and the exhaust gas stream 303 (indicated by arrows) are led past a first dosage device 371, arranged to inject a first additive into the exhaust stream 303. A first exhaust treatment component 310 comprising a reduction catalytic converter portion 331 is arranged downstream of the first dosage device 371, e.g., an injection nozzle, forming part of an additive dosing system, which is arranged to supply additive to the exhaust stream 303 for use in the first reduction catalytic converter 331.

The first reduction catalytic converter 331 is arranged to reduce nitrogen oxides $NO_x$ being present in the exhaust stream 303 through the use of reagent being supplied through the first additive to the exhaust stream by the first dosage device 371. The first reduction catalytic converter may, according to embodiments of the invention, at least partly constitute a selective catalytic reduction (SCR) catalytic converter. The exhaust treatment component 310 is also configured to perform further exhaust treatment through a second part 333 of the exhaust treatment component 310, as further discussed below.

The first additive can, for example and according to the disclosed embodiment, be an additive comprising urea as reagent and e.g., consist of AdBlue which constitutes a frequently used additive and which consists of a mixture of approximately 32.5% urea dissolved in water. Urea forms ammonia when heated, and the ammonia is then used as reagent and reacts with nitrogen oxides $NO_x$ in the exhaust gas stream. The present invention is applicable when using AdBlue, as well as when using any other urea based additive, or any additive supplying a reagent suitable for use in the reduction of nitrogen oxides. The additive may also consist solely of the reagent, and hence consist e.g., of ammonia.

The additive dosing system further comprises an additive tank 376, which is connected to the injection nozzle 371 and also an injection nozzle 372 (see below) via a pump 373. The dosing of additive is controlled by an additive control unit 374, which generates control signals for controlling the supply of additive by controlling nozzles 371 and 372 and pump 373 so that a desired amount is injected into the exhaust gas stream 303 from the tank 376 using the injection nozzles 371, 372.

As mentioned, the exhaust treatment component 310 further comprises a second portion 333 which, inter alia, provides functionality of an oxidation catalytic converter 310, and is therefore configured to oxidize one, or several, of nitrogen oxides $NO_x$ and incompletely oxidized carbon compounds in the exhaust stream 303.

The exhaust treatment component 310 is at least partly coated with a catalytically oxidizing coating, wherein such oxidizing coating may comprise at least one precious metal, for example platinum. The use of the exhaust treatment component 310 in this manner results in an oxidation of nitric oxide NO into nitrogen dioxide $NO_2$, which is beneficial, for example, in regard of the efficiency in soot oxidation in the particulate filter DPF. The oxidation catalytic converter may also generate heat through oxidation of unburned hydrocarbons HC in the exhaust stream. The oxidation of nitric oxide NO into nitrogen dioxide $NO_2$ is also advantageous with regard to reduction of nitrogen oxides $NO_x$ as discussed above, in the present example through use of a downstream reduction catalytic converter 332, in the present example also consisting of a selective catalyst reduction (SCR) catalytic converter, and associated additive, the second SCR catalytic converter 332 being arranged downstream the particulate filter 320.

The exhaust treatment component portion 333 also provides functionality of an ammonia slip catalytic converter, and subjects ammonia being present in the exhaust gas stream exiting the SCR catalytic converter 331 to oxidation in order to form e.g., nitrogen gas and water. There may also be further forms of oxidation of ammonia. Ammonia is generally considered toxic, and emissions of ammonia may also be restricted by regulations. The oxidation of ammonia in an ammonia slip catalytic converter may reduce undesired discharge of ammonia into the surroundings of the vehicle.

The exhaust system 130 further comprises a particulate filter 320, located downstream of the exhaust treatment component 310, and which, in a manner known per se, is arranged to catch and oxidize soot particles. The exhaust gas stream 303 passes through the filter structure of the particulate filter 320, where soot particles are caught in the filter structure from the passing exhaust stream 303, and are stored and oxidized in the particulate filter 320.

Downstream the particulate filter 320, the illustrated exhaust treatment system 130 comprises a second dosage device, e.g., an injection nozzle, 372, in the present example forming part of the same additive dosing system as said first dosage device 371, and which is arranged to supply reagent (ammonia) through additive to the exhaust stream 303 for use in the second SCR catalytic converter 332. This additive can, as according to the disclosed embodiment, be additive supplied from the same tank as the additive supplied by the first dosage device and hence e.g., consist of AdBlue.

The supply of additive supplied by nozzles 371, 372 can be arranged to be controlled through the use of control unit 374, such that different amounts of additive are caused to be supplied by the different nozzles 371, 372, and where any or both injection nozzles may be caused to supply additive at some given point in time. The first and second SCR catalytic converters 331, 332 may also be designed with substantial differences in capacity regarding e.g., reduction of nitric oxides, where, for example, the first (upstream) reduction catalytic converter may be designed with less, and even considerably less, capacity for reducing nitric oxides in comparison to the second reduction catalytic converter. Furthermore, different additive dosing systems for supply of additive by nozzles 371, 372, respectively, and it is also contemplated that different kinds of additive are supplied from different tanks.

The exhaust treatment system 130 may also be equipped with one or several sensors, such as one or more $NO_x$ sensors 361, 362, 363, 364 and/or one or several temperature sensors (not shown) which are arranged for the determination of $NO_x$ concentrations and temperatures in the exhaust treatment system 130, respectively. According to embodiments of the present invention, at least one of the two $NO_x$ sensors 362, 363 is utilized. $NO_x$ sensor 362 is arranged upstream the particulate filter 320 but downstream the exhaust treatment component 310. According to embodiments of the invention, the $NO_x$ sensor 362 is not utilized, but instead $NO_x$ sensor 363 downstream the particulate filter 320 but upstream the nozzle 372 is utilized. The $NO_x$ sensor 361, located upstream the exhaust treatment component 310 may or may not be present in systems of the disclosed kind. The $NO_x$ sensor 364 is arranged downstream the SCR catalytic converter 332, and provides a measure of the occurrence of nitrogen oxides leaving the vehicle following passage through the exhaust treatment system 130. The $NO_x$ sensor 364 is not used according to the invention, but is in general present for other determinations, such as tailpipe emissions.

According to embodiments of the invention, the $NO_x$ sensor 362, and/or 363, is utilized to determine presence of ammonia. $NO_x$ sensors may be utilized to determine presence of ammonia due to the fact that such sensors are cross-sensitive to ammonia. According to embodiments of the invention, and as exemplified below, one (or more) ammonia sensor(s) is used instead, the ammonia sensor(s) being located similarly to the sensors 362 and/or 363.

Dosing systems for the supply of additive are well described in the art, and the precise manner in which the supply of additive is dosed/performed is therefore not described in detail herein. In general, the dosing varies, in principle, continuously, as the operating conditions changes and the generation of nitrogen oxide therewith.

However, as was explained above, the functionality of a system of the kind disclosed in FIG. 3 depends on the functionality of the individual components forming part of the system. For example, it is oftentimes essential that oxidation of nitric oxides into NO nitrogen dioxide $NO_2$ upstream the downstream SCR catalytic converter occurs to an expected/desired extent.

With regard to reduction catalytic converters, such as SCR catalytic converters, reduction of nitric oxides and nitrogen dioxide occurs principally according to three main reactions, where, according to the fastest reaction, nitric oxide NO and nitrogen dioxide $NO_2$ are reduced at a same proportion and rate. When this reaction no longer can occur, e.g., because either the nitric oxide NO or the nitrogen dioxide $NO_2$ has been consumed, further reactions take place at a slower rate, where firstly nitric oxides is reduced, and secondly nitrogen dioxide $NO_2$ is reduced.

Hence, depending on the relative proportions of nitric oxides and nitrogen dioxide $NO_2$ when entering the second SCR catalytic converter 332, the resulting occurrence following the second SCR catalytic converter 332 may be highly dependent on oxidation of nitric oxide NO into nitrogen dioxide $NO_2$ prior to the exhaust gases entering the second (downstream) SCR catalytic converter 332.

According to the invention, it is provided a method for diagnosing an aftertreatment component such as the exhaust treatment component 310, and/or the particulate filter 320 as the case may be, with respect to the capability of oxidizing nitric oxides NO into nitrogen dioxide $NO_2$. An exemplary method 200 according to the invention will be described in the following with reference to FIG. 2.

The person skilled in the art will appreciate that a method for diagnosing oxidation according to the present invention may be implemented in a computer program, which, when it is executed in a computer, instructs the computer to execute the method. The computer program is usually constituted by a computer program product stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc., and be arranged in or in connection with a control unit/system/means, whereupon the computer program is executed by the control unit/system/means.

A plurality of the functions of a vehicle, such as controlling the exhaust treatment components and the internal combustion engine are, in general, controlled by control means such as e.g., a control system and/or a control unit. Control systems in modern vehicles commonly comprise communication bus systems comprising one or more communication buses for linking a number of electronic control units (ECU's), or means or controllers, and various components located on the vehicle. Such a control system can comprise a large number of control units/means and the responsibility for a specific function can be divided amongst more than one control unit. Vehicles of the shown type thus often comprise significantly more control units than the control units shown in FIG. 1A, which is well known to the person skilled in the art within this technical field. The control units/means 115, 131, 374 of FIG. 1A may hence communicate with one another via the communication bus system, partly indicated by interconnecting lines in FIG. 1A. When a method according to embodiments of the invention is implemented in a control unit/means e.g., of the exemplified kind this may hence be accomplished using a computer program stored on storage means of the control unit/means and being executed by executing means of the control unit/means. A method according to embodiments of the invention may also be implemented using a combination of a plurality of computer programs, which may be implemented in a same or different control units/means. A vehicle control system may also comprise only a single control unit/means carrying out the various control system functions of the vehicle.

The present invention can be implemented in any suitable control unit/control means, and, according to the illustrated example, the invention is implemented in control unit/means 374 for controlling the supply of additive. The invention may, however, also be implemented in any other suitable control unit/means and/or combination of control units/means, such as control unit 131. The diagnosing of the oxidation capabilities according to embodiments of the invention will usually depend on signals being received from other control units/means and/or vehicle components, and it is generally the case that control units/means of the disclosed type are normally adapted to receive sensor signals from various parts of the vehicle 100. The control unit/means 374 may, for example, receive control signals representing engine parameters and signals e.g., from one or more of sensors 362, 363, 364, e.g., via control unit 131. Control units/means of the illustrated type are also usually adapted to deliver control signals to various parts and components of the vehicle, e.g., to control the supply of additive and/or other control units/means of the control system of the vehicle.

Figure 1B:
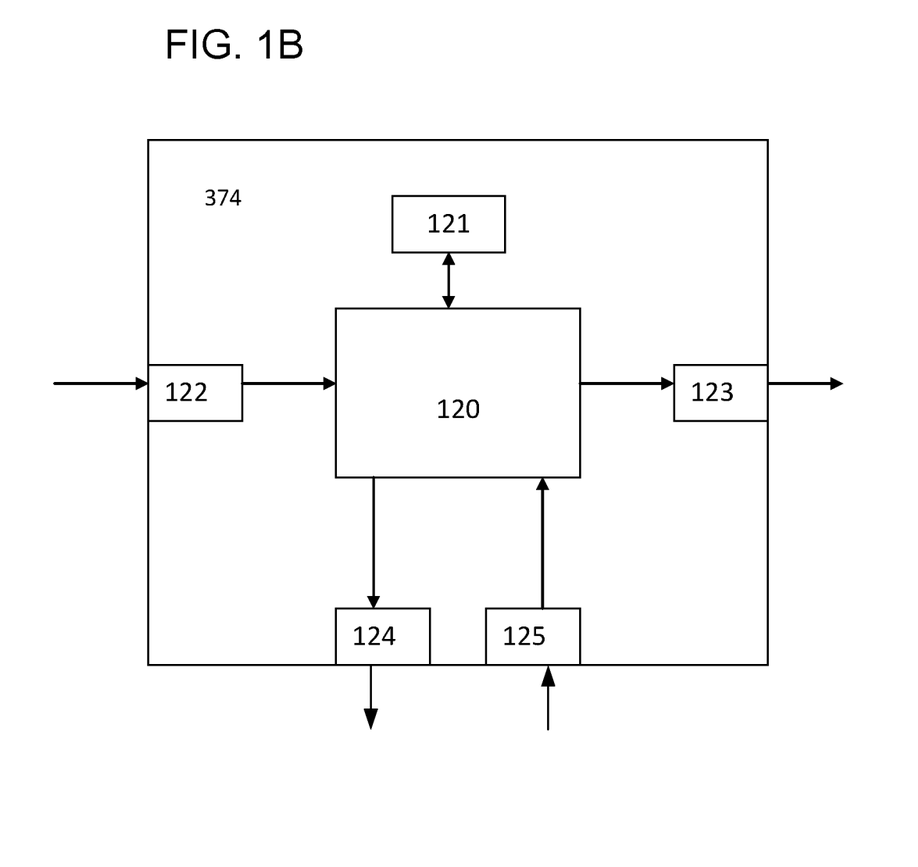
FIG. 1B illustrates an example of a control unit in a vehicle control system.

An exemplary control unit/means (the control unit/means 374) forming part of, or constituting, the vehicle control system is schematically shown in FIG. 1B, wherein the control unit/means comprise a computing unit 120, which can comprise, for example, any suitable type of processor or microcomputer, such as a circuit for digital signal processing (Digital Signal Processor, DSP) or a circuit having a predetermined specific function (Application Specific Integrated Circuit, ASIC). The computing unit 120 is connected to a memory unit 121, which provides the processing unit 120, with e.g., the stored program code 126 and/or the stored data that the computing unit 120 requires to be able to perform calculations. The computing unit 120 is also arranged so as to store partial or final results of computations in the memory unit 121.

Furthermore, the control unit/means 374 is provided with devices 122, 123, 124, 125 for receiving and transmitting input and output signals. These input and output signals can comprise waveforms, impulses or other attributes that can be detected as information and can be converted into signals which can be processed by the computing unit 120. These signals may then be made available to the computing unit 120. The devices 123, 124 for transmission of output signals are arranged to convert signals received from the processing unit 120 in order to create output signals by, for example, modulating the signals, which can be transmitted to other parts of and/or systems of the vehicle. Each of the connections to the devices for receiving and transmitting input and output signals may comprise of one or more of a cable; a data bus, such as a CAN bus (Controller Area Network bus), a MOST bus (Media Oriented Systems Transport) or any other bus configuration, or a wireless connection. A person skilled in the art will appreciate that the claimed system, or part of the claimed system may comprise the control unit/means 374 where means of the claimed system may comprise the computing unit 120.

Figure 2:
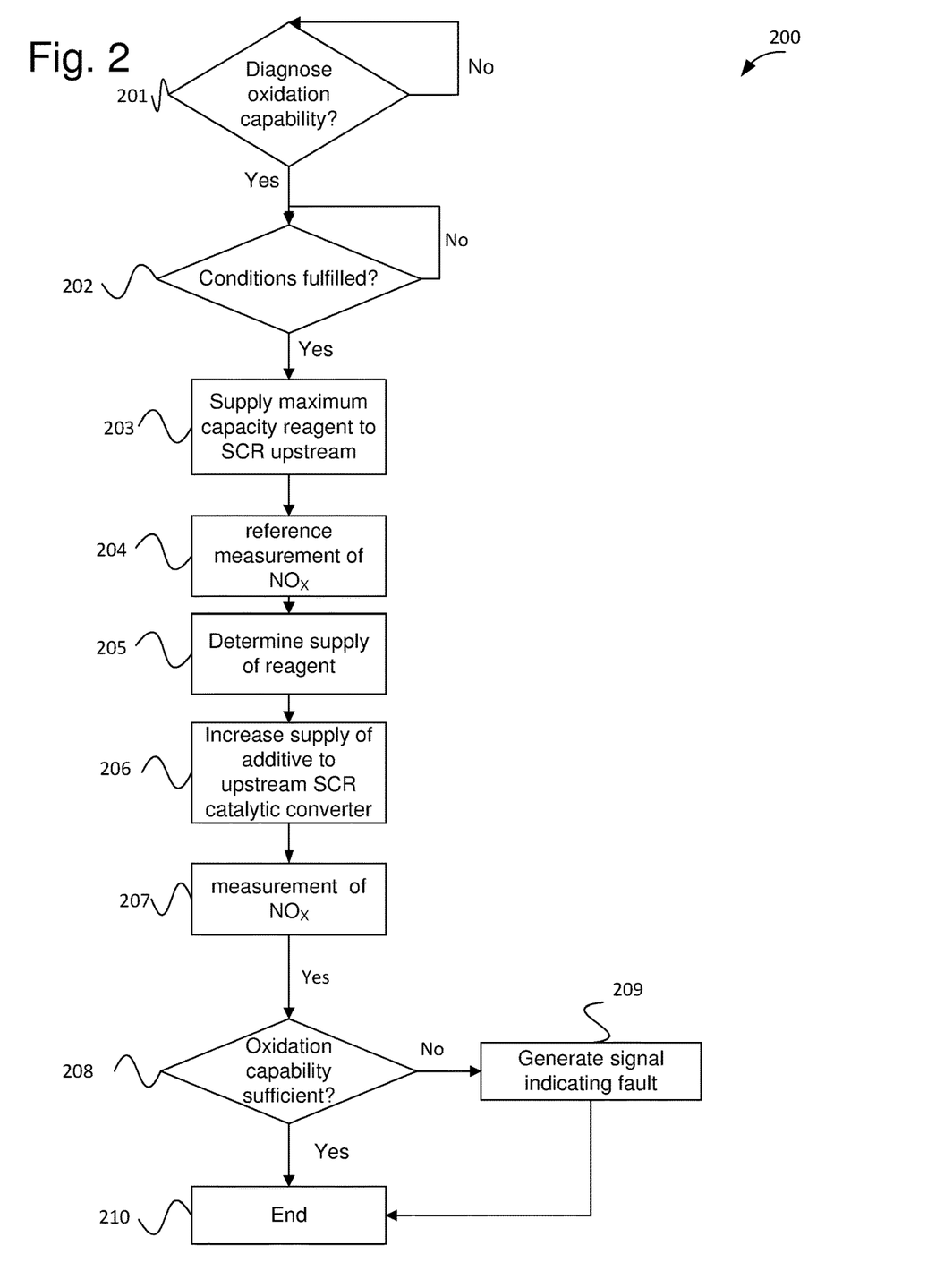
FIG. 2 illustrates an exemplary method according to embodiments of the invention.

Returning to the exemplary method 200 illustrated in FIG. 2, the method starts in step 201, where it is determined whether the feed gas, i.e., exhaust gases, supplied to the second SCR catalytic converter is to be diagnosed according to the objects of embodiments of the present invention. This is performed by diagnosing the functionality of one or more of the exhaust treatment components, and in particular with regard to oxidation capabilities. The method remains in step 201 for as long as this is not the case. The method continues to step 202 when it is determined that a diagnosis of the oxidation capabilities is to be carried out according to the invention. The transition from step 201 to step 202 can, for example, be initiated according to various criteria. For example, according to embodiments of the invention, an evaluation according to the invention is performed at regular intervals, e.g., to ensure that the vehicle is not being driven for longer periods of time with a system that is not operating properly. The transition may also be triggered e.g., if sensor signals output by the $NO_x$ sensor 364 indicates increased emissions of nitrogen oxides $NO_x$.

In step 202 it is determined whether conditions for performing the diagnosis is fulfilled. For example, it may be determined whether e.g., the exhaust treatment component 310 has reached a temperature sufficient to perform the desired oxidation. In addition, or alternatively, it may be determined whether the internal combustion engine is operating according to an operating point at which it is suitable to carry out the diagnosis. This can, for example, be a determination of whether the internal combustion engine 101 is operating at relatively constant conditions with regard to speed of rotation and load. The method may remain in step 202 for as long as the conditions for performing the diagnosis are not fulfilled. According to embodiments of the invention, the diagnosis is performed irrespective of the prevailing conditions in which case step 202 may be omitted.

In step 203, ammonia is supplied to the exhaust gas stream by causing a supply of additive to an extent corresponding to the maximum capacity of the SCR catalytic converter in terms of amount of reagent that can be consumed without substantial release of excess ammonia. As exemplified above, the additive may comprise urea which when heated by the exhaust gas stream will form ammonia to be used to reduce nitrogen oxides using the SCR catalytic converter 331 as catalyst.

This amount may be temperature dependent. The additive is supplied to the exhaust gas stream upstream the first SCR catalytic converter 331 using nozzle 371. The upstream catalytic converter 331 is in general only capable of reducing a portion of the nitrogen oxides in the exhaust gas stream being discharged by the internal combustion engine 101, so that no determination of the actually occurring levels of nitrogen oxides upstream the SCR catalytic converter 331 needs to be determined. According to embodiments of the invention, however, it is contemplated that such determination is made, e.g., using sensor signals output by a sensor such as $NO_x$ sensor 361 and or a model representation of the exhausts leaving the internal combustion engine 101.

In step 204 a reference measure of the occurrence of nitrogen oxides $NO_x$ in the exhaust gas stream downstream the exhaust treatment component 310 is determined using $NO_x$ sensor 362. This current level of occurrence is hence determined using sensor signals output by the $NO_x$ sensor 362, where this may be arranged to be performed e.g., for a period of time to obtain a mean-value to be used in the determinations, where this mean value can be determined e.g., as moving average.

In step 205 the amount of additive to be supplied to the exhaust gas stream is set to a level of supply where there will be a noticeable leakage of ammonia, i.e., ammonia slip, from the SCR catalytic converter portion 331 into the exhaust treatment component 310 portion 333 due to the supply exceeding the ammonia consuming capabilities of the SCR catalytic converter 331. For as long as the exhaust treatment component 310 is working properly, the ammonia exiting the SCR catalytic converter 331 will, at least to a substantial extent, be oxidized by the exhaust treatment component portion 333 acting as ammonia slip catalytic converter. Excess ammonia that the first SCR catalytic converter 331 is not capable of storing and which is not being consumed by $NO_x$ oxidation will hence be oxidized by the exhaust treatment component portion 333.

However, in case the ammonia conversion in the exhaust treatment component 333 is not properly occurring, ammonia released by the SCR catalytic converter 331 will pass through and be released also by the downstream component portion 333. The present invention utilizes, in combination with the supply of excess additive, the relation that in case the oxidation of ammonia does not work properly, the oxidation of nitric oxides NO into nitrogen dioxide $NO_2$ will also not work properly. This is because the same catalyst, such as the same precious metal, is utilized in the oxidation process.

According to embodiments of the invention, intentional ammonia slip is utilized to diagnose the oxidation of nitric oxides NO into nitrogen dioxide $NO_2$, and thereby inherently the feed gas being supplied to the second (downstream) SCR catalytic converter 332. The diagnosis is performed by monitoring the sensor signals of the $NO_x$ sensor 362 and/or sensor 363. According to the present example, the sensor 362 is a $NO_x$ sensor. According to the embodiments of the invention, the sensor may, instead, comprise an ammonia sensor. $NO_x$ sensors are not capable of differing between nitric oxide NO and nitrogen dioxide $NO_2$, and, furthermore, such sensor is also not capable of distinguishing between nitrogen oxides and ammonia. The $NO_x$ sensor is hence cross-sensitive to ammonia. This is utilized according to embodiments of the invention, since this, in turn, means that in case there is a release of ammonia from the exhaust treatment component 310, the sensor 362 will indicate a higher presence of nitrogen oxides $NO_x$ than when there is no ammonia slip present.

According to embodiments of the invention, this increase is detected and used to diagnose the oxidation capabilities of the exhaust treatment component 310.

In step 205, therefore, the amount of additive to be supplied is redetermined to a supply that will exceed the maximum amount that the SCR catalytic converter 331 is capable of consuming in the reduction process. This amount may be temperature dependent, and the amount of additive being supplied may also be set to exceed the maximum amount that the SCR catalytic converter 331 is capable of consuming by an amount that, in case following oxidation of ammonia is not operating properly, will give rise to a distinguishable difference in levels of occurrence of $NO_x$ sensor 362, e.g., also when sensor accuracies are taken into account. The maximum amount that the SCR catalytic converter 331 is capable of consuming may be known from the design stage of the component, and/or be determined through empirical tests, e.g., in the manufacturing/assembly process of the vehicle. As stated above, the occurrence of nitrogen oxides $NO_x$ upstream the SCR catalytic converter 331 in general need not be known, but according to embodiments this occurrence may be taken into account, e.g., in case the presence could be lower than the maximum reduction capacity of the upstream SCR catalytic converter 331.

In step 206 the supply of additive 376 upstream the first SCR catalytic converter 331, which in general is continuously ongoing, is caused to be increased to the levels determined in step 205 and supplied through injection nozzle 371.

According to embodiments of the invention, the method may then wait for a predetermined period of time to allow the consequences of the increased supply of additive to have full impact on the resulting changes of the exhaust gas stream composition downstream the exhaust treatment component 310.

In step 207, the level of occurrence is again determined using sensor signals output by the $NO_x$ sensor 362 in a manner similar to the determination in step 204, where, as above, this may be arranged to be performed e.g., for some suitable period of time e.g., to obtain a mean-value to be used in the determinations, where this mean value can be determined e.g., as moving average.

Alternatively, or in addition, the moving average, or occurrence, may continuously be monitored, and when e.g., an increase or other change in measurement result according to the below is detected, this may be utilized to diagnose the oxidation capabilities.

In step 208 it is determined whether the oxidation is deemed to function properly, or whether a fault is deemed to be present. In this case e.g., diagnostic trouble codes may be set as appropriate according to current legislation, and/or further actions may be taken, such as alerting the driver and/or e.g., controlling vehicle performance to reduce the negative impact caused by the faulty component, step 209. Otherwise, the method is ended in step 210.

Figure 4A:
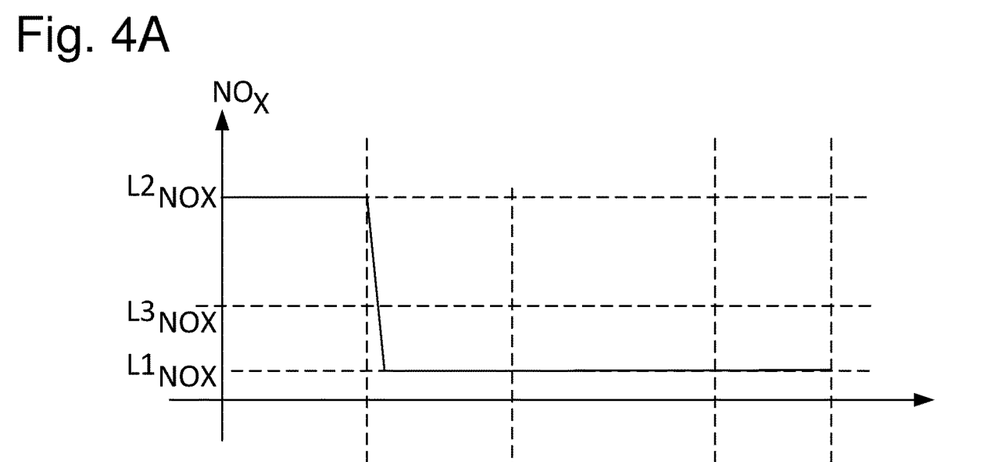
FIG. 4A-4C illustrate a further exemplary method according to embodiments of the invention.
Figure 4B:
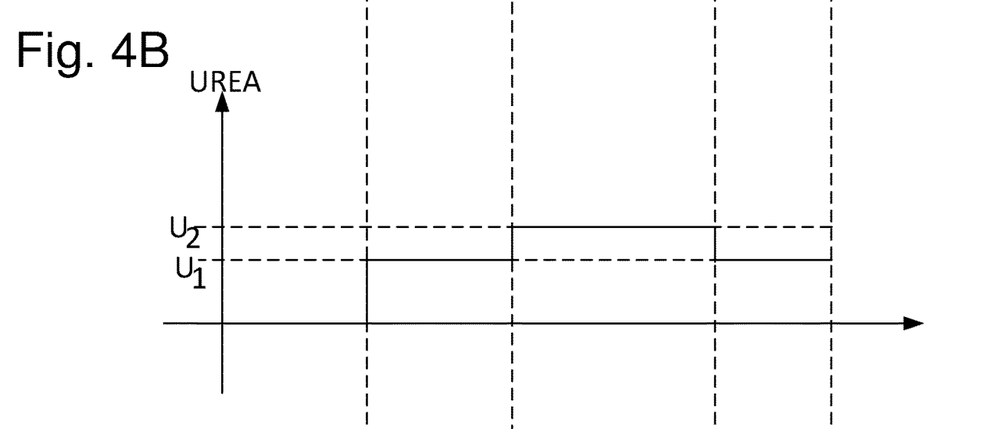
Figure 4C:
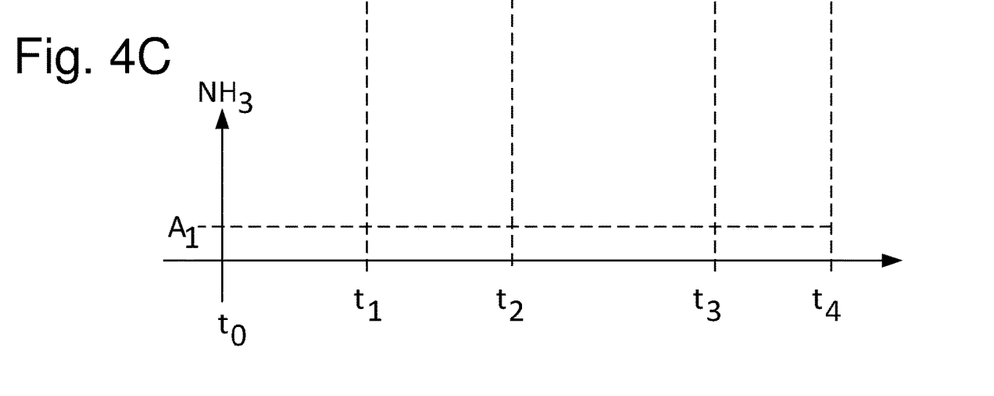
Figure 5A:
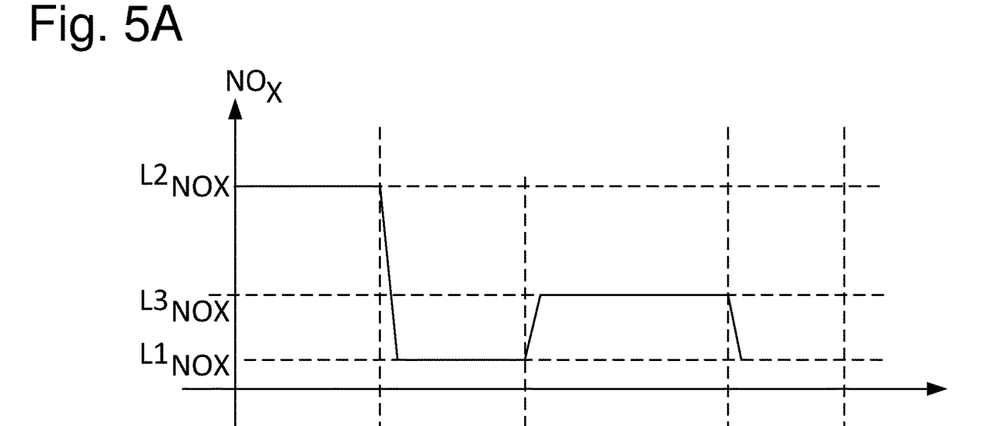
FIG. 5A-5C illustrate a further exemplary method according to embodiments of the invention.
Figure 5B:
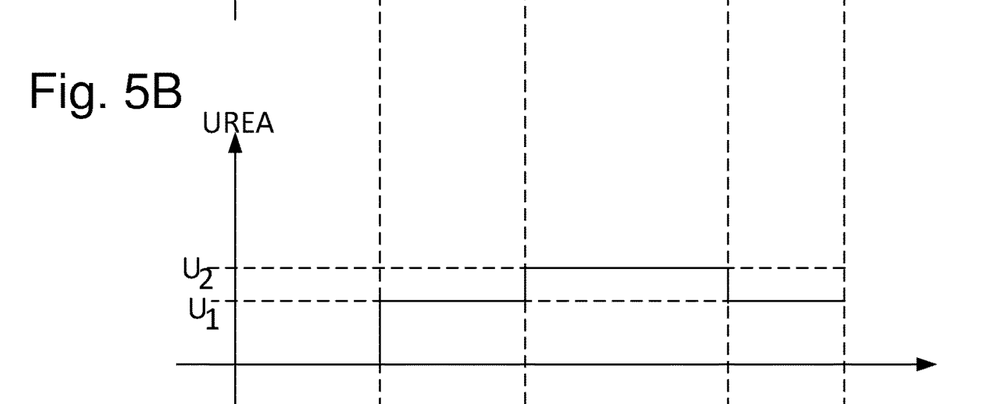
Figure 5C:
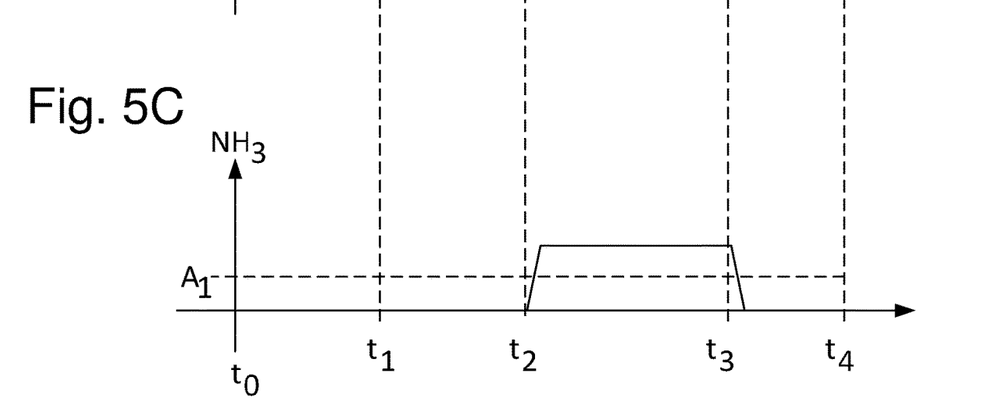

FIGS. 4A-C and FIGS. 5A-C illustrates an example of a diagnosis being performed according to the present invention, such as e.g., according to the exemplary method of FIG. 3, where FIGS. 4A-C illustrates a properly operating system while FIGS. 5A-C illustrates a system where oxidation is not occurring to a desired extent.

FIG. 4A illustrates $NO_x$ levels as detected by $NO_x$ sensor 362 as a function of time. FIG. 4B illustrates the supply of additive, and FIG. 4C illustrates occurrence of ammonia $NH_3$ in the exhaust gas stream downstream the exhaust treatment component 310. FIG. 4C also represent the sensor signals that would be received in case an ammonia sensor would be utilized instead of a nitrogen oxide $NO_x$ sensor. At time t0 there is no supply of additive, i.e., the amount of additive shown in FIG. 4B is zero, and nitrogen oxides $NO_x$ occurring in the exhaust gas stream are being essentially the same in terms of occurrence following passage of the exhaust treatment component 310. The relative proportion between nitric oxides NO and nitrogen dioxide $NO_2$ will however change if the oxidation in the exhaust treatment component part 333 operates properly. When no additive is supplied, the occurrence is represented by level $L2_{NOX}$, which is for illustrative purposes only, where the level can be seen as an average value, which in reality will vary continuously with variations in engine load, engine operating point etc.

There is also no occurrence of ammonia downstream the exhaust treatment component 310 as indicated by FIG. 4C. At time $T_1$ additive is supplied to an extent $U_1$ corresponding to the maximum capacity of the SCR catalytic converter 331 in regard of ammonia consummation without ammonia passing through the SCR catalytic converter 310 unused. Hence, an increase in the supply of additive above this level will give rise to ammonia being released by the SCR catalytic converter 331. According to embodiments of the invention, this dosage may be performed as a step of the invention as is the case in FIG. 2, but this supply is oftentimes already being dosed in normal usage to maximally benefit from the upstream SCR catalytic converter. This dosage may also be used in determining the reference level of occurrence $L1_{NOX}$ of nitrogen oxides $NO_x$ in step 204, which may hence be performed between times $t_1$ and $t_2$.

At time $t_2$ the dosing of additive is increased to a level $U_2$ exceeding the maximum capacity of the SCR catalytic converter 331, i.e., step 203 above. In case the oxidation in the exhaust treatment component portion 333 operates properly, this increase in supply of additive, giving rise to ammonia slip, will have no significant impact on the sensor signals delivered by the $NO_x$ sensor 362 since the ammonia will be oxidized prior to reaching the $NO_x$ sensor 362. Hence, since the SCR catalytic converter 331 were already operating at maximum capacity, there will be no decrease in occurrence of nitrogen oxides $NO_x$, but also no increase in detected occurrence $L1_{NOX}$ due to the ammonia being oxidized. Hence, the sensor signals delivered by the $NO_x$ sensor 362 between time $t_2$ and $t_3$ is essentially the same as in the time interval $t_1$-$t_2$ in this case.

Hence, in case there is no increase in detected presence of nitrogen oxides $NO_x$ when the supply of additive is increased above the level U1, it can be determined in step 208 that the oxidation of ammonia is functioning properly.

In particular, in step 208, the measure may be compared with an expected value to determine whether the oxidation of ammonia is functioning properly. The expected value can e.g., be a value that will not be exceeded unless the oxidation is malfunctioning, and/or, as in the present example, the measure taken in step 207 is compared with the measure taken in step 204. As was mentioned above, FIG. 4C may illustrate the sensor signals that would be delivered by an ammonia sensor, and in case an ammonia sensor is utilized instead of a nitrogen oxide sensor, it may be determined if the sensor signal values instead exceed a predetermined value. This determination hence only needs to determine whether the sensor signals increase to a predetermined level, e.g., level $A_1$ which is not the case in the present example, where in this case the level $A_1$ is a reference measure.

Since it is the same catalysts (precious metal) that are used in the oxidation of nitrogen oxides $NO_x$ as for oxidation of ammonia, the oxidation of nitrogen oxides $NO_x$ can also be assumed to function properly, and thereby the feed gas being supplied to the second, downstream, SCR catalytic converter 332 can also be diagnosed to fulfil set requirements. When the oxidation capabilities have been diagnosed according to the above, the supply of additive may be caused to be reduced, e.g., to the level U1 that prevailed prior to the diagnosis was commenced at time $t_3$.

If, on the other hand, the oxidation is not taking place to a satisfactory extent, a different result will be obtained. This is illustrated in FIGS. 5A-C, which are similar to FIGS. 4A-C. Hence, according to the above, the supply of additive is increased to a level U2 exceeding the maximum capacity of the SCR catalytic converter 331 at time $t_2$ to force ammonia slip. In the present example, the oxidation in the exhaust treatment component portion 333 does not operate properly, and therefore the increased supply of additive giving rise to ammonia slip will impact the sensor signals delivered by the $NO_x$ sensor 362. The occurrence of ammonia in the exhaust gas stream being discharged from the exhaust treatment component 310 is illustrated in FIG. 5C, and as can be seen from the figure, the ammonia level rises from essentially zero level to a level exceeding the level $A_1$, since the ammonia will not be oxidized prior to reaching the $NO_x$ sensor 362.

This, in turn, has the result that since the SCR catalytic converter 331 was already operating at maximum capacity, the occurrence of nitrogen oxides $NO_x$ does not decrease, but instead increase to a level $L3_{NOX}$ due to the presence of ammonia in the exhaust gas stream, where, as discussed above, $NO_x$ sensors are cross-sensitive to ammonia. This increase in detected nitrogen oxides $NO_x$ may therefore be used in the comparison with the expected value, e.g., reference value, in step 208 to determine that oxidation is not occurring to an expected extent, and that therefore the exhaust treatment component 310 is malfunctioning, and thereby the feed gas to the downstream SCR catalytic converter will also not fulfil desired criteria. In case an ammonia sensor is utilized instead of a NOX sensor, it may instead be determined whether the level $A_1$ is exceeded. In this case, a reference value may be determined in step 203, but in general the occurrence will be essentially zero so this step may also be omitted. The level $A_1$ may instead be used as reference value.

Consequently, according to embodiments of the invention, the feed gas to the downstream SCR catalytic converter can be diagnosed in a manner that is less intrusive on exhaust emissions in comparison to e.g., evaluations using oxidation of hydrocarbons.

According to embodiments of the invention, when comparing a measure of the present occurrence of nitrogen oxides $NO_x$ using sensor signals output by the $NO_x$ sensor 362 with a predetermined value, the predetermined value may be determined such that the current operating point/ conditions for which the measure is taken are taken into account. Such operating conditions may relate e.g., to current speed of rotation and load of the internal combustion engine 101. Such reference value may be determined beforehand and hence be already present in the control system of the vehicle, so that the reference value may be determined also in this manner.

According to embodiments of the invention, the measurement of the occurrence of nitrogen oxides/ammonia is performed downstream the particulate filter instead of downstream the exhaust treatment component 310. This is because the particulate filter may comprise a catalyst such as precious metal that is also capable of oxidizing substances passing through the particulate filter. Hence the exhaust treatment component 310 may be malfunctioning, but the system may still be deemed to operate properly since the particulate filter may compensate for the loss in oxidation of the exhaust treatment component 310. In case the oxidation is deemed to be insufficient when measuring downstream the particulate filter, it may be concluded that both components are malfunctioning.

According to embodiments of the invention, there may be sensors arranged both upstream and downstream the particulate filter as in FIG. 3, and according to this example, the components may be individually evaluated with regard to oxidation capabilities. According to embodiments of the invention, there is no $NO_x$ sensor, or ammonia sensor, arranged upstream the aftertreatment components. Instead, only a $NO_x$ sensor downstream the reduction catalytic converter may be utilized, such as $NO_x$ sensor 364.

Furthermore, the invention may also be utilized when the vehicle is taken in for service, where the diagnosis can be performed in a highly controllable manner with the vehicle is standing still and in essentially constant ambient conditions.

In such situations the internal combustion engine may be set to operate according to a predetermined operating point, where the operating point can be set such that the exhaust gases reach at least a minimum temperature to ensure proper heating of the aftertreatment components.

Finally, the present invention has been exemplified for a vehicle. The invention is, however, applicable in any kind of craft, such as, e.g., aircrafts and watercrafts. The invention is also applicable for use in combustion plants. Also, the aftertreatment system may comprise further components than the components above as is known per se.

The invention claimed is:

1. A method for diagnosing a first exhaust treatment component for treatment of an exhaust gas stream resulting from combustion in an internal combustion engine,
   said first exhaust treatment component comprising means for oxidizing nitric oxide into nitrogen dioxide,
   wherein nitrogen oxide in said exhaust gas stream is reduced through the use of a first reduction catalytic converter being arranged upstream said means for oxidizing nitric oxide into nitrogen dioxide,
   and a second reduction catalytic converter being arranged downstream said means for oxidizing nitric oxide into nitrogen dioxide,
   wherein a reagent is supplied to said exhaust gas stream for reduction of nitrogen oxides in said first catalytic converter,
   and wherein a first sensor is arranged to measure an occurrence of nitrogen oxide downstream said means for oxidizing nitric oxide into nitrogen dioxide but upstream said second reduction catalytic converter, said method comprising:
    causing supply of reagent upstream said first reduction catalytic converter to reduce nitrogen oxide through the use of said first reduction catalytic converter, reagent being caused to be supplied to an extent exceeding the extent to which reagent is consumed by the first reduction catalytic converter to thereby cause reagent to be released by said first reduction catalytic converter,
    using output from said first sensor, determining a first measure of the occurrence of reagent downstream said means for oxidizing nitric oxide into nitrogen dioxide; and
    diagnosing said means for oxidizing nitric oxide into nitrogen dioxide based on said first measure.

2. A method according to claim 1, further including, when diagnosing said means for oxidizing nitric oxide into nitrogen dioxide:
    diagnosing the oxidation of nitric oxide into nitrogen dioxide based on said first measure.

3. A method according to claim 1, further including, when diagnosing said means for oxidizing nitric oxide into nitrogen dioxide based on said first measure:
    determining whether said first measure of the occurrence of reagent exceeds a reference measure.

4. A method according to claim 3, further including:
    using output from said first sensor, determining said reference measure of the occurrence of reagent prior to determining said first measure of the occurrence of reagent, and prior to causing supply of reagent to an extent exceeding the extent to which reagent is consumed by the first catalytic converter, and
    diagnosing said means for oxidizing nitric oxide into nitrogen dioxide using said first measure and said reference measure.

5. A method according to claim 4, further including:
    when determining said reference measure, causing supply of reagent to a reduced extent in comparison to the extent to which reagent is caused to be supplied when determining said first measure.

6. A method according to claim 4, further including:
    when determining said reference measure, causing supply of reagent to an extent corresponding to the extent to which reagent is consumed by the first catalytic converter.

7. A method according to claim 1, further including:
    determining said first measure using output from a sensor being sensitive to nitrogen oxides and the reagent, the measure of the reagent being represented by a combined measure of the occurrence of nitrogen oxides and the reagent.

8. A method according to claim 1, further including:
    determining said first measure using output from a sensor being sensitive to the reagent but not to nitrogen oxides.

9. A method according to claim 8, further including:
    determining that said means for oxidizing nitric oxide into nitrogen dioxide provides insufficient oxidation when said first measure exceeds a threshold value.

10. A method according to claim 1, further including, when determining a measure of the occurrence of reagent downstream said means for oxidizing nitric oxide into nitrogen dioxide:
    determining said measure as an average occurrence of reagent for a first period of time.

11. A method according to claim 1, further including, when diagnosing said means for oxidizing nitric oxide into nitrogen dioxide based on said first measure:
    monitoring signals delivered by said first sensor, and
    determining that oxidation is insufficient when an increase in said sensor signals is detected following an increase in the supply of reagent upstream said first reduction catalytic converter to an extent exceeding the extent to which reagent is consumed by the first reduction catalytic converter.

12. A method according to claim 1, further including:
    determining said first measure downstream a first exhaust treatment component, said first exhaust treatment component comprising said means for oxidizing nitric oxides, and/or
    determining said first measure downstream a second exhaust treatment component, said second exhaust treatment component comprising means for oxidizing nitric oxides and being arranged downstream said first exhaust treatment component.

13. A method according to claim 12, said first exhaust treatment component comprising said first reduction catalytic converter and said means for oxidizing nitric oxides.

14. A computer program product comprising computer program code stored on a non-transitory computer-readable, medium comprising said computer program product configured for diagnosing a first exhaust treatment component for treatment of an exhaust gas stream resulting from combustion in an internal combustion engine, said first exhaust treatment component comprising means for oxidizing nitric oxide into nitrogen dioxide, wherein nitrogen oxide in said exhaust gas stream is reduced through the use of a first reduction catalytic converter being arranged upstream said means for oxidizing nitric oxide into nitrogen dioxide, and a second reduction catalytic converter being arranged downstream said means for oxidizing nitric oxide into nitrogen dioxide, wherein a reagent is supplied to said exhaust gas stream for reduction of nitrogen oxides in said first catalytic converter, and wherein a first sensor is arranged to measure an occurrence of nitrogen oxide downstream said means for oxidizing nitric oxide into nitrogen dioxide but upstream said second reduction catalytic converter, said computer program code comprising computer instructions to cause one or more control units to perform the following operations:
    causing supply of reagent upstream said first reduction catalytic converter to reduce nitrogen oxide through the use of said first reduction catalytic converter, reagent being caused to be supplied to an extent exceeding the extent to which reagent is consumed by the first reduction catalytic converter to thereby cause reagent to be released by said first reduction catalytic converter;
    using output from said first sensor, determining a first measure of the occurrence of reagent downstream said means for oxidizing nitric oxide into nitrogen dioxide; and
    diagnosing said means for oxidizing nitric oxide into nitrogen dioxide based on said first measure.

15. A system for diagnosing a first exhaust treatment component for treatment of an exhaust gas stream resulting from combustion in an internal combustion engine,
    said first exhaust treatment component comprising means for oxidizing nitric oxide into nitrogen dioxide,
    wherein nitrogen oxide in said exhaust gas stream is reduced through the use of a first reduction catalytic converter being arranged upstream said means for oxidizing nitric oxide into nitrogen dioxide,
    and a second reduction catalytic converter being arranged downstream said means for oxidizing nitric oxide into nitrogen dioxide, wherein a reagent is supplied to said exhaust gas stream for reduction of nitrogen oxides in said first catalytic converter, and wherein a first sensor is arranged to measure an occurrence of nitrogen oxide downstream said means for oxidizing nitric oxide into nitrogen dioxide but upstream said second reduction catalytic converter, said system comprising:

means adapted to cause supply of reagent upstream said first reduction catalytic converter to reduce nitrogen oxide through the use of said first reduction catalytic converter, reagent being caused to be supplied to an extent exceeding the extent to which reagent is consumed by the first reduction catalytic converter to thereby cause reagent to be released by said first reduction catalytic converter;

means adapted to, using output from said first sensor, determining a first measure of the occurrence of reagent downstream said means for oxidizing nitric oxide into nitrogen dioxide; and means adapted to diagnose said means for oxidizing nitric oxide into nitrogen dioxide based on said first measure.

16. A vehicle c comprising a system system for diagnosing a first exhaust treatment component for treatment of an exhaust gas stream resulting from combustion in an internal combustion engine, said first exhaust treatment component comprising means for oxidizing nitric oxide into nitrogen dioxide, wherein nitrogen oxide in said exhaust gas stream is reduced through the use of a first reduction catalytic converter being arranged upstream said means for oxidizing nitric oxide into nitrogen dioxide, and a second reduction catalytic converter being arranged downstream said means for oxidizing nitric oxide into nitrogen dioxide, wherein a reagent is supplied to said exhaust gas stream for reduction of nitrogen oxides in said first catalytic converter, and wherein a first sensor is arranged to measure an occurrence of nitrogen oxide downstream said means for oxidizing nitric oxide into nitrogen dioxide but upstream said second reduction catalytic converter, said system comprising:

means adapted to cause supply of reagent upstream said first reduction catalytic converter to reduce nitrogen oxide through the use of said first reduction catalytic converter, reagent being caused to be supplied to an extent exceeding the extent to which reagent is consumed by the first reduction catalytic converter to thereby cause reagent to be released by said first reduction catalytic converter;

means adapted to, using output from said first sensor, determining a first measure of the occurrence of reagent downstream said means for oxidizing nitric oxide into nitrogen dioxide; and means adapted to diagnose said means for oxidizing nitric oxide into nitrogen dioxide based on said first measure.

\* \* \* \* \*